(12) United States Patent
Seaman et al.

(10) Patent No.: US 10,906,545 B2
(45) Date of Patent: Feb. 2, 2021

(54) ADJUSTING MECHANICAL ELEMENTS OF CARGO TRANSPORTATION UNITS

(71) Applicant: BlackBerry Limited, Waterloo (CA)

(72) Inventors: Conrad Delbert Seaman, Guelph (CA); Stephen West, Manotick (CA); Kristian Neil Spriggs, Ottawa (CA)

(73) Assignee: BlackBerry Limited, Waterloo (CA)

( * ) Notice: Subject to any disclaimer, the term of this patent is extended or adjusted under 35 U.S.C. 154(b) by 109 days.

(21) Appl. No.: 15/388,479

(22) Filed: Dec. 22, 2016

(65) Prior Publication Data
US 2018/0178797 A1     Jun. 28, 2018

(51) Int. Cl.
| | |
|---|---|
| *B60W 30/18* | (2012.01) |
| *B60W 10/184* | (2012.01) |
| *B60W 10/20* | (2006.01) |
| *B60W 10/22* | (2006.01) |
| *B60W 10/30* | (2006.01) |
| *B60W 30/02* | (2012.01) |
| *G05D 1/00* | (2006.01) |
| *G05D 1/02* | (2020.01) |
| *G06Q 10/08* | (2012.01) |
| *G07C 5/00* | (2006.01) |

(52) U.S. Cl.
CPC .... *B60W 30/18009* (2013.01); *B60W 10/184* (2013.01); *B60W 10/20* (2013.01); *B60W 10/22* (2013.01); *B60W 10/30* (2013.01); *B60W 30/02* (2013.01); *G05D 1/0011* (2013.01); *G05D 1/0219* (2013.01); *G06Q 10/083* (2013.01); *G07C 5/008* (2013.01); *B60W 2300/125* (2013.01); *B60W 2420/52* (2013.01); *B60W 2530/10* (2013.01); *B60W 2530/20* (2013.01); *B60W 2552/00* (2020.02); *B60W 2552/05* (2020.02); *B60W 2554/00* (2020.02); *B60W 2555/20* (2020.02); *B60W 2556/50* (2020.02); *B60W 2710/18* (2013.01); *B60W 2710/20* (2013.01); *B60W 2710/22* (2013.01); *B60W 2710/30* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 3,412,876 A | 11/1968 | Calabrese | |
| 4,780,043 A | 10/1988 | Fenner et al. | |
| 5,015,145 A | 5/1991 | Angell et al. | |
| 6,290,277 B1 | 9/2001 | Spykerman et al. | |
| 6,304,856 B1 * | 10/2001 | Soga | G06Q 10/063 705/28 |

(Continued)

OTHER PUBLICATIONS www.autoflexsuspensions.com/autoflex/—Auto Flex—Air Ride Suspension System dated on or before Nov. 13, 2016 (2 pages).

(Continued)

*Primary Examiner* — Navid Ziaeianmehdizadeh
(74) *Attorney, Agent, or Firm* — Trop, Pruner & Hu, P.C.

(57) ABSTRACT

In some examples, a controller includes at least one processor configured to receive information regarding a condition associated with a cargo transportation unit (CTU), the received information regarding the condition including information of an environment around the CTU at a location of the CTU, and adjust an adjustable mechanical element of the CTU in response to the received information.

20 Claims, 4 Drawing Sheets

(56) References Cited

U.S. PATENT DOCUMENTS

| | | | | |
|---|---|---|---|---|
| 6,499,343 | B1* | 12/2002 | Haas | B60S 5/02 |
| | | | | 73/146 |
| 8,123,281 | B2 | 2/2012 | Perkins et al. | |
| 8,155,868 | B1* | 4/2012 | Xing | G07C 5/0808 |
| | | | | 340/439 |
| 8,496,078 | B2 | 7/2013 | Wellborn | |
| 9,436,182 | B2* | 9/2016 | Nemec | G05D 1/0055 |
| 9,511,634 | B2 | 12/2016 | Chan et al. | |
| 2003/0233189 | A1* | 12/2003 | Hsiao | G01C 21/26 |
| | | | | 701/521 |
| 2004/0069850 | A1 | 4/2004 | De Wilde | |
| 2005/0102073 | A1* | 5/2005 | Ingram, II | B60C 23/003 |
| | | | | 701/31.4 |
| 2007/0276619 | A1* | 11/2007 | Sugahara | G01T 7/00 |
| | | | | 702/82 |
| 2008/0169144 | A1 | 7/2008 | DeGrave et al. | |
| 2010/0117320 | A1 | 5/2010 | Grozev et al. | |
| 2010/0194143 | A1 | 8/2010 | Perkins | |
| 2011/0084162 | A1 | 4/2011 | Goossen et al. | |
| 2011/0276215 | A1 | 11/2011 | Wendling | |
| 2013/0103259 | A1* | 4/2013 | Eng | B60G 17/019 |
| | | | | 701/37 |
| 2013/0184931 | A1* | 7/2013 | Boss | B60C 11/246 |
| | | | | 701/36 |
| 2013/0190979 | A1* | 7/2013 | Clayton | B60C 23/002 |
| | | | | 701/36 |
| 2014/0297113 | A1 | 10/2014 | Zuckerman et al. | |
| 2015/0174972 | A1* | 6/2015 | Zhou | B60C 23/003 |
| | | | | 340/447 |
| 2015/0203116 | A1* | 7/2015 | Fairgrieve | B60W 30/143 |
| | | | | 701/93 |
| 2015/0254986 | A1* | 9/2015 | Fairfield | G08G 1/22 |
| | | | | 707/687 |
| 2016/0052351 | A1* | 2/2016 | Dilisio | B60C 23/003 |
| | | | | 701/36 |
| 2016/0368534 | A1* | 12/2016 | Harda | B62D 15/025 |
| 2018/0082343 | A1* | 3/2018 | Gordon | G06Q 30/0279 |
| 2018/0113480 | A1* | 4/2018 | Lota | B60R 5/04 |
| 2019/0113935 | A1* | 4/2019 | Kuo | B60P 1/00 |

OTHER PUBLICATIONS

VSE—Dynamic Truck and Trailer Suspension DTS Suspension, Advanced Steering & Suspension Solutions, Version 2009 (24 pages).
www.kudauk.ltd.uk/shop/truck-aerodynamics/lasereye-auto-spoiler-adjustment—LaserEye, Automatic Truck Spoiler, Roof Deflector Adjustment System dated on or before Nov. 13, 2016 (7 pages).
www.psitireinflation.com/how-atis-works—P.S.I. The Inflation System—How Automatic Tire Inflation Systems Work, 2015 (2 pages).
www.truckingefficiency.org/tire-pressure-inflation-trailer—Tire Pressure Inflation Systems (Trailers) dated on or before Nov. 13, 2016 (11 pages).
Dronelife News, 5 Reasons Drones Will Change the Future of Cargo, Aug. 11, 2014 (9 pages).
Insurance Journal, First Licensed Autonomous Freight Truck Flits the Road in U.S., May 6, 2015 (8 pages).
Petersen, Ryan, Crunch Network, the driverless truck is coming, and it's going to automate millions of jobs, Apr. 25, 2016 (12 pages).
www.platformuca.org/—The Platform for Unmanned Cargo Aircraft (PUCA), 2016 (2 pages).
Seaman et al., U.S. Appl. No. 15/388,491 entitled Controlling Access to Compartments of a Cargo Transportation Unit filed Dec. 22, 2016 (32 pages).
Seaman et al., U.S. Appl. No. 15/254,654 entitled Improving Efficiency of a Cargo Shipping System filed Sep. 1, 2016 (51 pages).
Canadian Intellectual Property Office, International Search Report and Written Opinion for PCT/CA2017/051569 dated Mar. 22, 2018 (10 pages).
European Patent Office, Extended European Search Report for Appl. No. 17883154.1 dated Jun. 24, 2020 (7 pages).

* cited by examiner

ADJUSTING MECHANICAL ELEMENTS OF CARGO TRANSPORTATION UNITS

BACKGROUND

Trucks, tractor-trailers, or tractors that are connected to chassis for carrying containers can be used to transport cargo that includes goods. Cargo can be transported from an origin (such as a factory, a warehouse, a retail outlet, etc.) to a destination (such as retail outlet, a warehouse, customer premises, etc.) along a route.

BRIEF DESCRIPTION OF THE DRAWINGS

Some implementations of the present disclosure are described with respect to the following figures.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cargo transportation unit (CTU) in the form of a moveable platform can be used to carry cargo items between different geographic locations. A "cargo item" can refer to any physical item that is to be delivered from one location to another location. "Cargo" can refer to one or more cargo items. In some examples, a CTU can be a container (that is attached to a tractor), a cargo carrying portion of a truck, or a trailer, where the container provides an enclosed space in which the physical items can be stored during shipment. In other examples, the CTU can include another type of carrier structure that is able to carry cargo items. More generally, the CTU can be part of, mounted on, or attached, as applicable, to a vehicle, such as a truck, a trailer, a tractor, a car, a railed vehicle (e.g., a train), a watercraft (e.g., a ship), an aircraft, a spacecraft, and so forth. The vehicle can haul the CTU that is part of, mounted on, or attached to the vehicle.

In some examples, a vehicle to which a CTU is attached to, mounted on, or part of, can be a driverless vehicle that can be self-driving. A driverless vehicle refers to a vehicle that is without a driver, i.e., a human that controls the movement of the vehicle while the driver is located on the vehicle. A self-driving vehicle has the intelligence and self-awareness to perform driving tasks, including driving itself from an origin to a destination, without any human driver on the vehicle.

Without the presence of a human driver, a CTU that is attached to, mounted on, or part of an unmanned vehicle may not be properly maintained or configured. Typically, when a CTU is associated with a vehicle that has a human driver, the human driver can perform checks of the CTU (such as before a trip begins, at specified points during a trip, at specified maintenance times, or at other times) to ensure that various mechanical elements of the CTU are properly maintained or configured. Examples of such mechanical elements can include any or some combination of the following: a tire, a wheel, a suspension, an aerodynamic shroud, a door lock, a brake, a seal, and so forth. The foregoing example mechanical elements are examples of adjustable mechanical elements that can be adjusted to different states. Although example adjustable mechanical elements are listed, it is noted that in other examples, additional or alternative adjustable mechanical elements can be employed in a CTU. More generally, an "adjustable mechanical element" of a CTU can refer to any adjustable mechanical element that is part of the CTU or that otherwise affects the operation of the CTU.

As examples, a human driver can perform checks of the CTU's tires, such as to determine whether the tires are inflated to a target pressure and to check the wear of the tires. Improperly maintained tires of the CTU can present a dangerous condition, since incorrectly inflated tires and/or tires with excessive wear may cause a CTU to lose control while traveling on a road, which can lead to accidents that can cause injury to humans and/or cause damage to the cargo carried by the CTU. Furthermore, incorrectly inflated tires and/or excessively worn tires can lead to inefficient operation of the CTU. For example, under-inflated tires results in increased friction between the tires and the road, which can lead to reduced gas mileage of the vehicle.

The CTU can include other adjustable mechanical elements that if not properly maintained or configured can lead to dangerous conditions or less efficient operation of the CTU.

Figure 1:
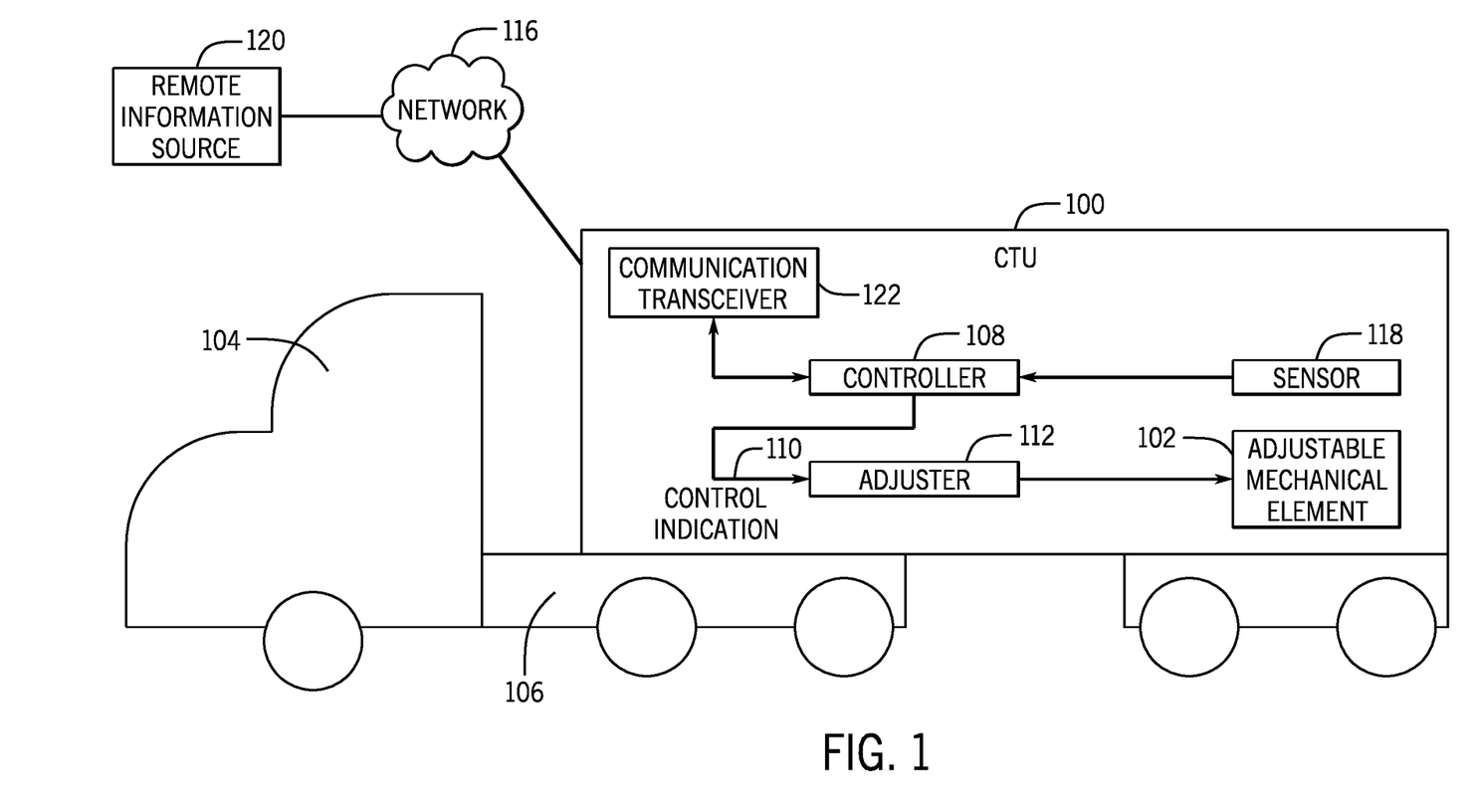
FIG. 1 is a block diagram of an example arrangement including a cargo transportation unit (CTU) and a vehicle attached to the CTU, according to some implementations.

In accordance with some implementations of the present disclosure, as shown in FIG. 1, automated adjustment of an adjustable mechanical element 102 of the CTU 100 can be performed. The adjustment of the adjustable mechanical element 102 is performed in the absence of any human driver at the CTU 100.

Although just one adjustable mechanical element 102 is shown in FIG. 1, it is noted that in other examples, the CTU 100 can include multiple adjustable mechanical elements that can be automatically adjusted, i.e., without input from a human driver of a vehicle that tows or moves the CTU 100.

As shown in FIG. 1, the CTU 100 is towed by a vehicle 104 (such as a tractor or other type of vehicle). In examples according to FIG. 1, the CTU 100 is separate from the vehicle 104, and the CTU 100 can be attached to a tow platform 106 of the vehicle 104 to allow the vehicle 104 to tow the CTU 100. In other examples, the vehicle 104 can be a truck, and the CTU 100 can be part of the truck 104. In further examples, the vehicle 104 can have a support structure on which the CTU 100 is placed.

In some examples, the vehicle 104 is a driverless vehicle. In alternative examples, the vehicle can be driven by a human driver.

In some examples, the CTU 100 includes a controller 108 that allows the CTU 100 to perform self-diagnosis and self-adjustment of the adjustable mechanical element 102. The controller 108 can include a hardware processing circuit which can include any one or more of the following: a microprocessor, a core of a multi-core microprocessor, a microcontroller, a programmable gate array, a programmable integrated circuit device, or another type of hardware processing circuit. In further examples, the controller 108 can include a combination of a hardware processing circuit and machine-readable instructions (software or firmware) executable on the hardware processing circuit.

In examples according to FIG. 1, the controller 108 that is part of CTU 100 provides a control indication 110 to an adjuster 112, which can perform adjustment of the adjustable mechanical element 102 in response to the control indication 110. The control indication 110 can include a control signal, a control message, an information element in a message, and so forth. In further examples, instead of being part of the CTU 100, the controller 108 can be part of the vehicle 104, and can communicate with the CTU 100.

In some examples, if the adjustable mechanical element 102 is a tire, the adjuster 112 can include a gas pump that is able to inflate or deflate the pressure of the tire, by respectively injecting gas into the tire or removing gas from the tire.

In further examples, if the adjustable mechanical element 102 is a wheel of the CTU 100 (where the wheel includes a combination of a tire and the rim that supports the tire), then the adjuster 112 can include a moveable member that is controllable to adjust an angle of the wheel.

If the adjustable mechanical element 102 is the suspension of the CTU 100, then the adjuster 112 can adjust the stiffness of the suspension. For example, if the suspension is a gas suspension, then the adjuster 112 can include a gas pump to either inject gas or remove gas from the suspension to adjust the stiffness of the ride of the CTU 100. As another example, if the suspension is a spring suspension, then the adjuster 112 can adjust a spring rate of the spring suspension to change the stiffness of the ride of the CTU 100.

If the adjustable mechanical element 102 is an aerodynamic shroud of the CTU 100, then the adjuster 112 includes a moveable member to change a position or angle of the aerodynamic shroud. Changing the position or angle of the aerodynamic shroud can change the amount of wind resistance being experienced by the CTU 100.

If the adjustable mechanical element 102 is a door lock, then the adjuster 112 can include a moveable member to lock or unlock the door lock. If the adjustable mechanical element 102 is a door of the CTU 100, then the adjuster 112 includes a moveable member to open or close the door.

If the adjustable mechanical element 102 is a brake, then the adjuster 112 can adjust the amount of force being applied by a brake. For example, if the CTU 100 has multiple brakes, then the controller 108 can control the adjuster 112 to control the braking forces applied by the individual brakes. On a slippery road, applying different braking forces on different brakes can assist in maintaining traction between the wheels of the CTU 100 and the road surface.

If the adjustable mechanical element 102 is a seal, then the adjuster 112 can cause engagement or disengagement with the seal to seal the inside chamber of the CTU 100, or a portion of the inside chamber of the CTU 100. For example, the seal can be provided on a door of the CTU 100. When the door is closed, the seal can be expanded or moved into better sealing engagement with the door.

Although examples of adjustable mechanical elements and how they can be adjusted are given above, it is noted that other adjustable mechanical elements can be provided in further examples.

The CTU 100 also includes a sensor 118 that can acquire any of various measurements relating to the CTU 100. Although just one sensor 118 is shown in FIG. 1, it is noted that in further examples, multiple sensors can be present in the CTU 100. Examples of sensors that can acquire measurements can include any or some combination of the following: a temperature sensor to measure temperature inside or outside the CTU 100, a humidity sensor to measure humidity inside or outside the CTU 100, a pressure sensor to measure pressure inside or outside the CTU 100, a location sensor to measure a location of the CTU 100, a speed sensor to measure a speed of the CTU 100, a weight sensor to measure a weight of the CTU 100, a load status sensor to measure a load status of the CTU 100 (e.g., whether or not the CTU 100 is loaded with at least one cargo item, or the amount of loading of the CTU 100, such as percentage loaded, e.g., 10% loaded, 25% loaded, 50% loaded, 80% loaded, etc.), a door status sensor to measure a status of a door of the CTU 100 (door open or door closed), an accelerometer to sense movement, a gyroscope to measure rotational movement, a tilt sensor to measure a tilt, a vibration sensor to measure vibration, a start/stop sensor to measure starting or stopping of the CTU 100, a wear level sensor to measure a wear level of a tire, a wind speed sensor to measure a wind speed and/or direction, a rain accumulation sensor to measure an accumulation of rain, a tire pressure sensor to measure a pressure of a tire, a temperature sensor to measure heat of the wheel (or hub) of a tire, a distance sensor to measure a number of rotations of a tire, a sensor to measure a force of a suspension of the CTU 100, such as by measuring a spring force or the gas pressure of a gas suspension, a brake sensor to measure a wear level or heat of a brake, or any other type of sensor.

A location sensor to measure a current location of the CTU 100 can include a Global Positioning System (GPS) receiver that determines a location based on communication with GPS satellites. Alternatively, the controller 108 can determine the location of the CTU 100 based on triangulation of signals received by a communication transceiver 122 from multiple wireless base stations or wireless access points that have known positions. The communication transceiver 122 of the CTU 100 is able to transmit and receive information over a network 116, which can be a wireless network.

The speed sensor can include a sensor coupled to the wheels of the CTU 100 or the engine of the vehicle 104 to determine the speed of the wheels or engine, and from such speed, the speed of the CTU 100. Alternatively, the speed sensor can include a GPS receiver that can monitor locations of the CTU 100 over time, such that the speed of the CTU 100 can be determined by the controller 108.

A weight sensor (or multiple weight sensors) can be coupled to the suspension(s) of the CTU 100, and can be used to measure the weight of the overall CTU 100.

The load status sensor can include an optical sensor (or multiple optical sensors) that can scan the inner chamber of the CTU 100 using light signals. Based on reflected light signals, the controller 108 can derive distances of surfaces that reflect light signals, and use such distances to determine whether or not cargo items are present in the inner chamber of the CTU 100, or in some cases, the amount of loading of cargo items in the inner chamber of the CTU 100. In further examples, the load status sensor can include a camera (or cameras) to capture image(s) of the inner chamber of the CTU 100. Processing of the captured image(s) can be performed by the controller 108 to determine whether or not the CTU 100 is loaded, and/or the amount of loading of cargo items in the inner chamber of the CTU 100. In further examples, the load status sensor can include a weight sensor (or multiple weight sensors) to measure the weight of the CTU 100. Using the weight of the CTU 100, the controller 108 determine whether or not cargo items are present in the inner chamber of the CTU 100, or in some cases, the amount of loading of cargo items in the inner chamber of the CTU 100. Alternatively, load status in the CTU 100 can be based on use of radar or electromagnetic signals (e.g., X-ray signals, radio signals, etc.).

A door status sensor can include a motion sensor (or multiple motion sensors) mounted on the door of the CTU 100. Examples of motion sensors include any or some combination of the following: an accelerometer, a gyroscope, etc. Motion detected by the motion sensor can be used by the controller 108 to determine whether or not the door is open or closed. Alternatively, other sensors such as a camera, a time of flight sensor, or radar can be used to determine the open/close status of a door.

The tire wear level sensor can include a camera (or multiple cameras) to capture an image of each tire of the CTU 100. The controller 108 can process the captured image of each tire and determine the wear level of the camera. Alternatively, the wear level sensor can be a sensor that is mounted on each tire. Once the tread of the tire has been worn to each respective level of multiple levels, the sensor can issue a corresponding alert (e.g., an alert is generated when the tire is 50% worn, another alert is generated when the tire is 75% worn, etc.). As another example, tire wear indicators can be integrated into the rubber of a tire, such as when the tire wear indicators are exposed due to tire wear, a voltage change, a current change, or other signal change is triggered.

The wind speed sensor can include a wind speed gauge mounted outside of the CTU 100 to measure a wind speed. The measurement can be made while the CTU 100 is stationary or when the CTU 100 is in motion.

The rain accumulation sensor can include a rain gauge that gathers an amount of water over time to measure an accumulation of rain.

Although FIG. 1 shows the sensor 118 as being part of the CTU 100, it is noted that in other examples, the sensor 118 can be part of the vehicle 104, and a communication link is provided between the vehicle 104 and the CTU 100 to communicate measurement information from the sensor 118 to the CTU 100. In examples where there are multiple sensors 118, one or more sensors can be part of the CTU 100, and one or more other sensors can be part of the vehicle 104.

In the ensuing discussion, when reference is made to a "sensor of the CTU," that can refer to either a sensor on the CTU 100, or a sensor of the vehicle 104 to which the CTU 100 is attached, mounted, or part of.

The measurement(s) acquired by the sensor 118 (or multiple sensors) is (are) provided to the controller 108, which can output the control indication 110 based on the received measurement(s) from the sensor(s) 118.

Additionally, in some examples, the controller 108 can receive information from a remote information source 120 over the network 116 (e.g., a wireless network). For example, the network 116 can include a cellular network, a wireless local area network (WLAN), or any other type of wireless network.

An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks. In additional examples, a wireless network can include a WLAN, which can operate according to the Institute of Electrical and Electronic Engineers (IEEE) 802.11 or Wi-Fi Alliance Specifications. In other examples, other types of wireless networks can be employed by the controller 108 to communicate with a remote service, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

Information from the remote information source 120 sent over the network 116 is received by the communication transceiver 122. Also, any information pertaining to the CTU 100 can be sent through the communication transceiver 122 over the network 116 to a remote target entity.

The remote information source 120 can provide information that may be relevant to the controller 108 in controlling an adjustment of the adjustable mechanical element 102. As examples, the remote information source 120 can include a website, a database, and so forth. For example, the remote information source 120 can be a website that provides weather information at various locations, a website that provides traffic information at various locations, a database that provides information regarding road types or road conditions (e.g., gravel road, concrete road, asphalt road, road with many potholes, etc.) at various locations, a database regarding safety of various locations (e.g., crime rate statistics at various locations), and so forth. Using the weather information, traffic information, and/or road type information at a current location or a predicted future location of the CTU 100, the controller 108 can control adjustment of the adjustable control element 102.

The predicted location may be predicted by the controller 108 of the CTU 100, or by a service that indicates or sends the predicted location to the controller 108. The predicted location may change from time to time depending on route modifications, destination changes, transportation speeds, etc. Predicted locations may be locations (and associated times) at which the CTU 100 is predicted, or expected to be, and points between the times and locations. The times and locations may be updated by the CTU 100 or service that CTU 100 may be connected with. The CTU 100 or the service may use various sensors to adjust the expected locations, as well as information from other CTUs or outside services such as weather and traffic information. If predicted locations are included in a list of times and locations, the CTU 100 may also interpolate or otherwise determine in-between times and locations that may be utilized by the CTU 100.

The current location of the CTU 100 can be determined based on information acquired by a GPS receiver, or based on triangulation from signals of multiple wireless base stations or wireless access points that have known positions, or based on a map application. The predicted future location of the CTU 100 can be based on a specified route of the CTU 100 (as the CTU 100 travels between an origin and a destination), the current speed of the CTU 100, traffic conditions along the specified route, and other information.

In examples where the adjustable mechanical element 102 is a tire, the following are examples of how the tire pressure can be adjusted based on information of an environment around the CTU 100, either at a current location of the CTU 100 or a predicted future location of the CTU 100. For example, in cold weather (e.g., a temperature that is less than a specified temperature threshold), the tire pressure can be increased by a specified amount to compensate for heat loss and lower volume of gas in the tire. In contrast, in hot weather (e.g., a temperature that is greater than a specified temperature threshold), the tire pressure can be decreased by a specified amount to compensate for increased heat generation due to interaction between the tire and the road. The temperature of a current location of the CTU 100 can be based on a temperature measurement by the sensor 118, and/or based on weather information from a weather website (an example of the remote information source 120) received over the network 116. The temperature at a predicted future location can be based on information from the weather website.

In further examples, weather information at a predicted future location of the CTU 100 can be based on measurements provided by other CTUs that have recently moved through the predicted future location of the CTU 100. The sensors of the CTUs can be communicated over a network.

In wet weather (e.g., such as during a heavy rain where rain is accumulating at some specified number of inches per hour), the tire pressure can be decreased to provide more traction on the road surface. Accumulation of rain can be based on a measurement by the sensor 118 and/or information from a weather website.

In response to detecting that the CTU 100 is traveling in city traffic, the tire pressure can be decreased to increase traction with the road surface. The determination of whether the CTU 100 is traveling in city traffic can be based on knowledge of the specified route of the CTU 100, a current or predicted future location of the CTU 100, traffic congestion (such as from a traffic website or from a map application), and/or a speed of the CTU 100 (acquired by a sensor of the CTU 100).

When the CTU 100 is traveling on a highway at higher speeds (such as during long distance travel), the tire pressure can be increased to reduce resistance between the tire and the road surface. The speed of the CTU 100 can be acquired by a sensor of the CTU 100.

For varying weights of cargo being carried by the CTU 100, the tire pressure can be increased or decreased in response to the detected weight of the cargo. The weight of the cargo of the CTU 100 can be based on a weight measured by a weight sensor of the CTU 100, or based on information of the cargo input to the controller 108, where the information of the cargo can include a weight of the cargo and other information. The weight of the CTU 100 can alternatively be computed based on a measurement of a strain gauge, a compression of a spring, or other techniques.

For gravel roads, the tire pressure can be reduced to prevent puncture. More generally, the tire pressure can be varied for different road types. Information relating to the types of roads along the specified route of the CTU 100 can be based on information provided by the remote information source 120 about types of roads.

The tire pressure can also be varied depending on the type of tire. For example, different tire pressures can be set for a summer tire, a winter tire, a rubber-type tire, and so forth. Information relating to the type of tire used by the CTU 100 can be input to the controller 108.

The tire pressure can also be varied depending on the type of cargo being carried. To reduce shock being absorbed by fragile cargo, the tire pressure can be reduced. Information about the type of cargo can be input to the controller 108. Cargo items can be provided with radio frequency identification (RFID) tags or barcodes or QR codes or other information that can be read by the CTU 100 as the cargo items are loaded, to allow the CTU 100 to determine the type of each cargo item.

To make decisions on how the tire pressure is to be adjusted based on various input information, the controller 108 can access a repository of mapping information that can map different combinations of inputs to respective different tire pressures. The repository of mapping information can be stored on a storage medium (not shown) that is part of the CTU 100, or alternatively, the repository of mapping information can be stored remotely and accessible by the controller 108 over the network 116. The repository of mapping information can be based on recommendations from tire manufacturers and/or from past experience of the industry Alternatively, the different inputs can be provided to a processing function that can be invoked by the controller 108, where the processing function can produce an output based on the various inputs.

Similar techniques can be applied by the controller 108 to control other types of adjustable control elements based on various input information.

For example, if the adjustable mechanical element 102 is a wheel (or tire hub) of the CTU 100, then the adjustment of an angle of the wheel can be based on detecting that the CTU 100 is making a turn. Turning the angle of the wheel can help the vehicle and CTU make a sharp turn.

If the adjustable mechanical element 102 is the suspension of the CTU 100, then the adjustment of the stiffness of the suspension can be based on the type of cargo, the type of road, and the speed of the CTU 100. If the cargo being transported is fragile, then the suspension can be made less stiff to reduce the amount of shock experienced by the cargo. If the road is a gravel road or one that has many pot holes, then the suspension can be made less stiff. On the other hand, if the CTU 100 is traveling at a high speed over a smooth road, then the suspension can be made more stiff to assist with handling of the vehicle and CTU.

If the adjustable mechanical element 102 is an aerodynamic shroud of the CTU 100, then the aerodynamic shroud can be adjusted based on a current speed of the CTU 100. At high speeds, the shroud can be adjusted to provide less wind resistance, for example.

If the adjustable mechanical element 102 is a door lock, then the locking or unlocking of the door can be based on a location of the CTU 100 (such as when the CTU 100 is at a pickup or drop-off location).

If the adjustable mechanical element 102 is a brake, then the amount of brake pressure applied on a brake can be based on a wear level of the brake. If the brake is worn, then additional pressure can be applied to achieve the same braking performance. Alternatively, to avoid further damage to a worn brake, the brake can be disabled and brakes on other wheels are used. Also, on a slippery road, selective braking of different wheels can be applied to maintain traction.

If the adjustable mechanical element 102 is a seal, then the seal can be adjusted based on whether or not the CTU 100 is in motion, or based on the type of cargo. If the CTU 100 is in motion, then the seal can be expanded to seal the inner chamber of the CTU 100. Alternatively, if the CTU 100 is carrying perishable cargo items, then the seal can be expanded to provide a seal to extend the life of the cargo items.

Figure 2:
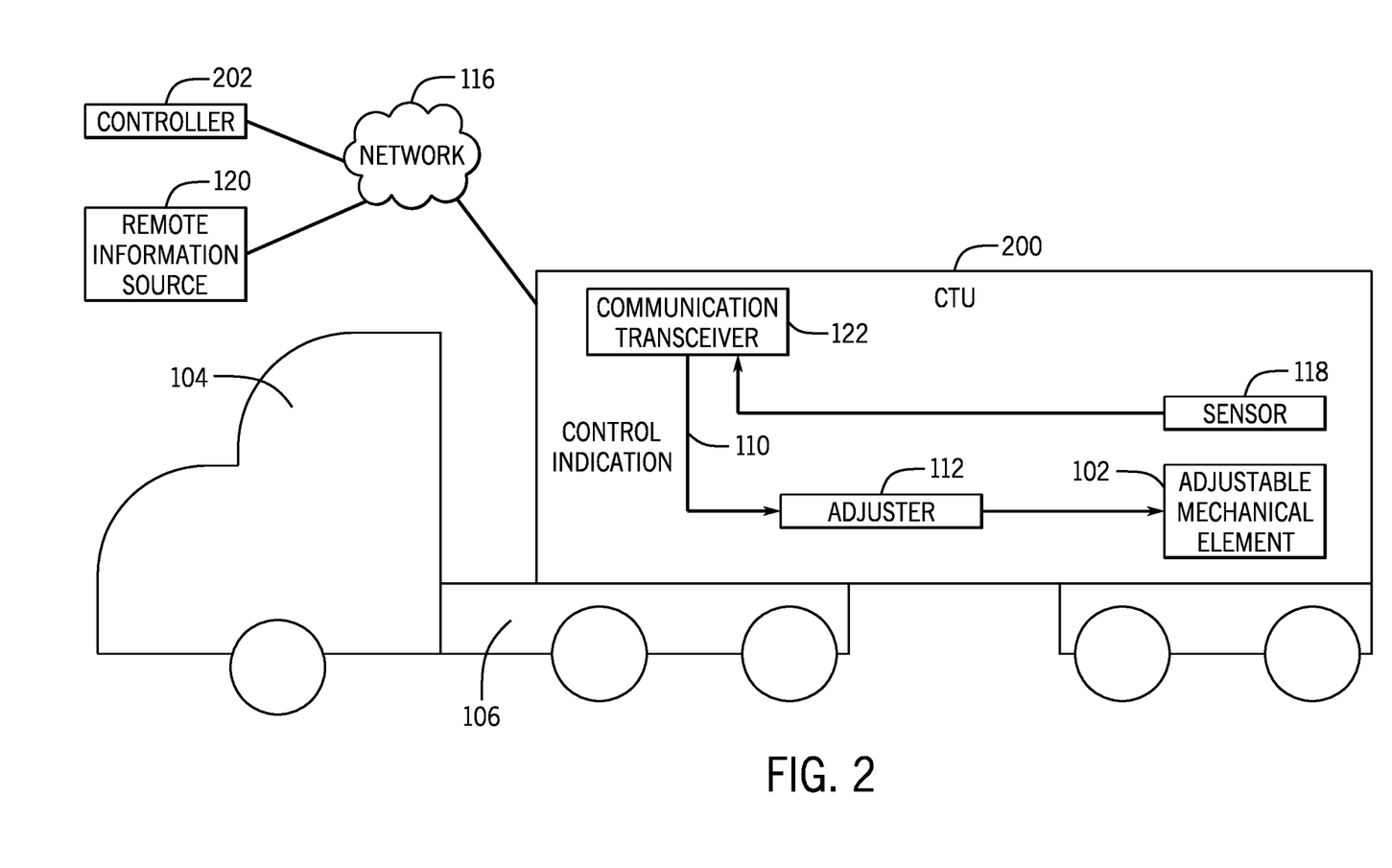
FIG. 2 is a block diagram of another example arrangement including a CTU, a vehicle attached to the CTU, and a remote controller, according to further implementations.

FIG. 1 shows examples where the controller 108 is part of the CTU 100. As shown in FIG. 2, in alternative examples, a CTU 200 is provided without an internal controller such as the controller 108 of FIG. 1. In examples according to FIG.

2, a controller 202 that is remotely located from the CTU 200 can be employed (the controller 202 is referred to as a "remote controller 202"). For example, the remote controller 202 can be part of a central system that includes one or more computers. The central system can include a server system that has one or more server computers, a cloud system, and so forth.

The controller 202 is able to communicate over the network 116 (with the CTU 200. In such examples, the communication transceiver 122 of the CTU 200 can transmit information regarding the CTU 200 over the network 116 to the remote controller 202, and the remote controller 202 can use the information provided by the CTU 200 as well as other information (e.g., from the remote information source 120) to perform controlling of the adjuster 112 to control the adjustable mechanical element 102. Based on the information received from the CTU 200 and/or information from the remote information source 120 (and/or possibly other information that has been input to the controller 202), the controller 202 is able to generate a control indication that is transmitted by the controller 202 over the network 116 to the CTU 200. The control indication received through the communication transceiver 122 of the CTU 200 is provided as the control indication to the adjuster 112 to adjust the adjustable mechanical element 102.

Figure 3:
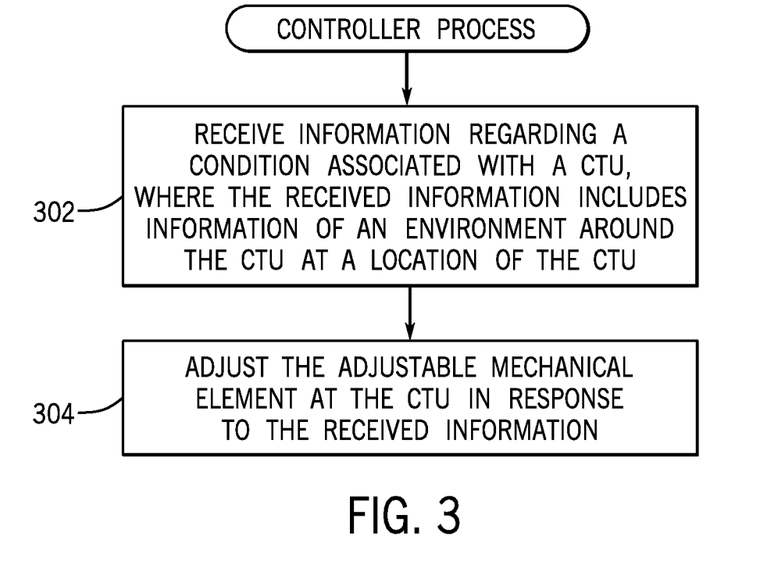
FIG. 3 is a flow diagram of an example process of a controller, according to some implementations.

FIG. 3 is a flow diagram of an example process that can be performed by a controller (e.g., 108 or 202) according to some implementations. The controller receives (at 302) information regarding a condition associated with a CTU (e.g., the CTU 100 of FIG. 1 or the CTU 200 of FIG. 2), where the received information regarding the condition includes information of the environment around the CTU at a location of the CTU. Note that the location of the CTU can be a current location of the CTU, or a predicted location of the CTU at a future time. The information of the environment around the CTU can include one or more of the following: weather information regarding a weather at a location of the CTU (e.g., temperature, pressure, humidity, rain, snow, ice, etc.), vehicle traffic information regarding traffic at a location of the CTU 100 (e.g., a traffic congestion level), information of a road type or road condition (e.g., whether the road is a concrete road, a gravel road, a road that has a lot of potholes, etc.), and information of safety at the location of the CTU 100 (e.g., whether the location is a location with a high or low crime rate, etc.). Although example types of information of the environment around the CTU are listed above, it is noted that alternative or additional types of information of the environment around the CTU can be provided in other examples. More generally, information of the environment around the CTU refers to information characterizing the environment that is outside of the CTU. This information may be current or predicted/expected future information, and may change over time.

The information regarding a condition associated with the CTU can also include information acquired by one or more sensors (e.g., 118 in FIG. 1 or 2) of the CTU. Additionally, the information regarding a condition associated with the CTU can include information input into the controller, such as the various information input into the controller discussed further above.

The controller adjusts (at 304) the adjustable mechanical element 102 at the CTU in response to the received information. The adjusting can be performed in response to the control indication 110 provided to the adjuster 112, where the control indication 110 can be provided by the controller 108 that is part of the CTU 100 (FIG. 1) or the controller 202 that is remotely located from the CTU 200 (FIG. 2).

Figure 4:
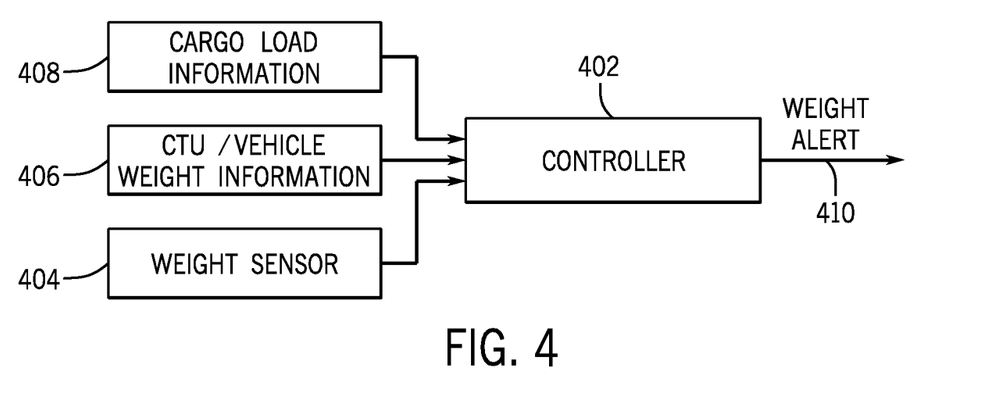
FIG. 4 is a block diagram of an example arrangement that includes a controller and a weight sensor, according to some implementations.

FIG. 4 illustrates an example arrangement that includes a controller 402 that is used for confirming the weight of the cargo that is to be transported by the CTU 100 or 200. The controller 402 can include the controller 108 that is part of the CTU 100 (FIG. 1), or the remote controller 202 that is remote from the CTU 200 (FIG. 2).

The controller 402 receives an output from a weight sensor 404 (or multiple weight sensors), which can be part of the CTU. The weight sensor(s) 404 can measure a weight that provides an indication of the weight of the cargo that is being carried by the CTU. For example, the weight sensor(s) can be part of the suspension(s) of the CTU. The weight sensor(s) can measure the total weight of the CTU and the cargo that is contained in the CTU. In examples where the CTU is mounted on or part of a vehicle, the weight sensor(s) 404 can measure the combined weight of the truck/vehicle, the CTU 100, and the cargo.

The weight of an unloaded CTU (without any cargo) and/or the vehicle is known. As shown in FIG. 4, CTU/vehicle weight information 406 is provided as an input to the controller 402. Based on the measured weight provided by the weight sensor(s) 404 and the CTU/vehicle weight information 406, the controller 402 is able to estimate the weight of the cargo carried by the CTU. For example, the controller 402 can subtract the weight represented by the CTU/vehicle weight information 406 from the total weight measured by the weight sensor(s) 404 to produce an output that is an estimate of the weight of the cargo.

In some cases, the weight information provided by the weight sensor(s) 404 of the CTU can be used to confirm whether a representation of a weight of the cargo included in cargo load information 408 is accurate. The cargo load information 408 can be provided by personnel or a system at the time the cargo is loaded onto the CTU, such as at a loading dock or other location. The cargo load information 408 provides a description of the cargo items that have been loaded onto the CTU. The cargo load information 408 can specify the total weight of the loaded cargo, or weights of the individual cargo items. The cargo load information 408 can also specify other information associated with the cargo items, such as the types of the cargo items, and so forth.

To confirm the weight of the cargo, the controller 402 can compare the weight estimated based on the output of the weight sensor(s) 404 with the representation of weight of the cargo included in the cargo load information 408. The controller 402 can then determine whether the weight estimated based on the output of the weight sensor(s) 404 is consistent with the representation of weight of the cargo included in the cargo load information 408.

If not (such as in response to the weight estimated based on the output of the weight sensor(s) 404 exceeding the representation of weight of the cargo included in the cargo load information 408 by greater than a specified threshold), a weight alert 410 can be generated by the controller 402, where the weight alert can be sent to a target entity. In examples where the CTU is being moved by a driverless vehicle, the weight alert 410 can be sent to a remote entity, such as a human operator located in a control center. In examples where the CTU is being moved by a vehicle with a human driver, the weight alert 408 can be provided to the driver of the vehicle.

The weight alert 110 can include a message or other notification indicating that there is an inconsistency in the weight estimated based on the output of the weight sensor(s) 404 and the representation of weight of the cargo included in the cargo load information 408.

Figure 5:
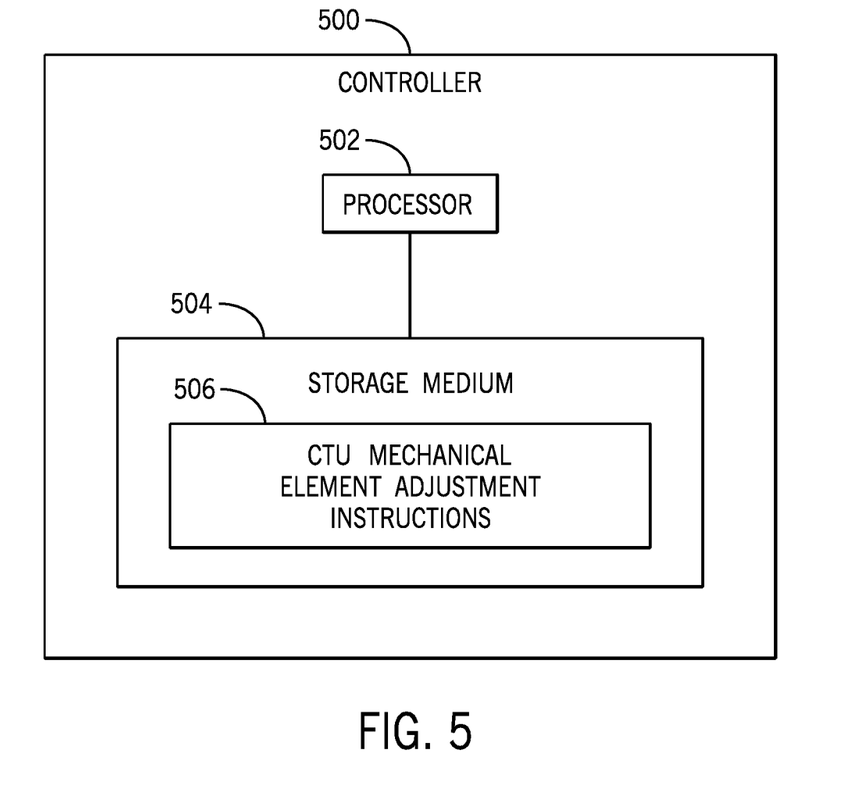
FIG. 5 is a block diagram of a controller according to some implementations.

In some examples, if the actual weight of the cargo exceeds the representation of weight of the cargo included in the cargo load information 408, then that can be used to make a determination of whether or not cargo items should be offloaded from the CTU. In some countries, weigh stations can be provided along highways to weigh trucks and their cargo. If the weight of the truck and CTU exceed the weight indicated by a bill of lading or other representation, then authorities may conduct a search of the cargo, which can take a relatively long time. The weight alert 110 can be provided to confirm ahead of travel whether or not FIG. 5 is a block diagram of an example controller 500 (e.g., the controller 108 of FIG. 1, the controller 202 of FIG. 2, or the controller 402 of FIG. 4). The controller 500 includes a processor 502, which can be a hardware processing circuit. The controller 500 further includes a non-transitory or computer-readable storage medium 504 that stores CTU mechanical element adjustment instructions 506 that are executable on the processor 502 to perform various tasks as discussed in the present disclosure.

The storage medium 504 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A controller comprising:
at least one processor configured to:
receive information regarding a condition associated with a cargo transportation unit (CTU), the received information regarding the condition comprising information of an environment around the CTU at a predicted future location of the CTU, and a weight of a cargo carried by the CTU as measured by a weight sensor;
determine, based on measurement data from a further sensor of the CTU, a type of the cargo that is based on a fragility of the cargo;
determine whether the weight of the cargo as measured by the weight sensor is consistent with a representation of a weight included in cargo load information provided at a time that the cargo is loaded into the CTU; and
cause adjustment of a suspension of the CTU in response to the type of the cargo based on the fragility of the cargo, and cause adjustment of a tire pressure of the CTU based on the type of the cargo based on the fragility of the cargo and the weight of the cargo as measured by the weight sensor.

2. The controller of claim 1, wherein the at least one processor is further configured to compute the predicted future location of the CTU based on a route of the CTU.

3. The controller of claim 1, wherein the information of the environment comprises one or more selected from among weather information, vehicle traffic information, information of a road type or road condition, and information of safety at the predicted future location of the CTU.

4. The controller of claim 1, wherein the received information further comprises information from a door status sensor on the CTU, the door status sensor to determine an open/close status of a door of the CTU.

5. The controller of claim 1, wherein the CTU is a first CTU, and wherein the received information comprises information from a sensor on a second CTU regarding the environment around the first CTU at the predicted future location of the first CTU.

6. The controller of claim 1, wherein the at least one processor is configured to adjust a door lock and a seal of the CTU in response to the received information.

7. The controller of claim 1, wherein the at least one processor is configured to further output an alert in response to determining that the weight of the cargo as measured by the weight sensor is not consistent with the representation of the weight.

8. The controller of claim 1, where the further sensor that detects the type of the cargo comprises a barcode reader.

9. A method comprising:
hauling, using a driverless vehicle, a cargo transportation unit (CTU) that carries cargo;
receiving, by a controller, information regarding a condition associated with the CTU, the received information regarding the condition comprising information of an environment around the CTU at a predicted future location of the CTU;
determining, by the controller based on measurement data from a sensor of the CTU, a type of the cargo based on a fragility of the cargo;
causing, by the controller, adjustment of a suspension of the CTU in response to the determined type of the cargo based on the fragility of the cargo; and
causing, by the controller, adjustment of a tire pressure of a tire of the CTU in response to the determined type of the cargo based on the fragility of the cargo.

10. The method of claim 9, further comprising causing, by the controller, adjustment of an adjustable mechanical element of the CTU in an absence of any human at the CTU, wherein the causing adjustment of the adjustable mechanical element is responsive to the received information and comprises one or more selected from among locking or unlocking a door of the CTU, opening or closing the door of the CTU, and adjusting a seal of the CTU.

11. The method of claim 9, further comprising measuring a weight of the cargo carried by the CTU using a weight sensor, wherein the causing adjustment of the tire pressure is further in response to the weight of the cargo carried by the CTU as measured by the weight sensor.

12. The method of claim 9, wherein the controller is part of the CTU.

13. The method of claim 9, wherein the controller is part of a remote system that is separate from the CTU, the remote system in communication with the CTU over a network.

14. The method of claim 9, wherein the controller is part of the driverless vehicle that hauls the CTU.

15. The method of claim 9, wherein the CTU is a first CTU, and wherein the information of the environment around the first CTU at the predicted future location of the first CTU is received over a network from a sensor of a second CTU that has passed through the predicted future location.

16. The method of claim 9, wherein the information regarding the condition associated with the CTU further comprises a weight of the cargo carried by the CTU as measured by a weight sensor, the method further comprising:
  determining whether the weight of the cargo as measured by the weight sensor is consistent with a representation of a weight included in cargo load information provided at a time that the cargo is loaded into the CTU;
  outputting an alert in response to determining that the weight of the cargo as measured by the weight sensor is not consistent with the representation of the,
  wherein the causing adjustment of the tire pressure of the tire of the CTU is further based on the weight of the cargo as measured by the weight sensor.

17. The method of claim 16, wherein the causing adjustment of the pressure of the tire of the CTU comprises varying the pressure of the tire to different pressures for different weights of the cargo as measured by the weight sensor.

18. A non-transitory machine-readable storage medium storing instructions that upon execution cause a controller to:
  receive information regarding a condition associated with a cargo transportation unit (CTU) that carries cargo, the received information regarding the condition comprising information of an environment around the CTU at a predicted future location of the CTU;
  cause adjustment of an adjustable mechanical element of the CTU in response to the received information, wherein the adjustment of the adjustable mechanical element comprises one or more selected from among locking or unlocking a door of the CTU, opening or closing the door of the CTU, and adjusting a seal of the CTU;
  determine a type of the cargo based on measurement data from a sensor of the CTU, the type of the cargo based on a fragility of the cargo;
  cause adjustment of a suspension of the CTU in response to the determined type of the cargo based on the fragility of the cargo; and
  cause adjustment of a tire pressure of a tire of the CTU in response to the determined type of the cargo based on the fragility of the cargo.

19. The non-transitory machine-readable storage medium of claim 18, wherein the CTU is a first CTU, and wherein the information of the environment around the first CTU at the predicted future location of the first CTU is received over a network from a second CTU that has a sensor that acquired the information of the environment at the predicted future location when the second CTU passed through the predicted future location.

20. The non-transitory machine-readable storage medium of claim 18, wherein the information regarding the condition associated with the CTU further comprises a weight of the cargo carried by the CTU as measured by a weight sensor, wherein the instructions upon execution cause the controller to:
  determine whether the weight of the cargo as measured by the weight sensor is consistent with a representation of a weight included in cargo load information provided at a time that the cargo is loaded into the CTU;
  output an alert in response to determining that the weight of the cargo as measured by the weight sensor is not consistent with the representation of the weight,
  wherein the causing adjustment of the pressure of the tire of the CTU is further based on the weight of the cargo as measured by the weight sensor.

* * * * *